US007632559B2

(12) United States Patent
Chang et al.

(10) Patent No.: US 7,632,559 B2
(45) Date of Patent: Dec. 15, 2009

(54) SOUND DEADENING AND STRUCTURAL REINFORCEMENT COMPOSITIONS AND METHODS OF USING THE SAME

(75) Inventors: Chin-Jui Chang, Troy, MI (US); Gerald Fitzgerald, Clinton Township, MI (US)

(73) Assignee: Sika Technology AG, Baar (CH)

( * ) Notice: Subject to any disclaimer, the term of this patent is extended or adjusted under 35 U.S.C. 154(b) by 1029 days.

(21) Appl. No.: 10/759,449

(22) Filed: Jan. 16, 2004

(65) Prior Publication Data

US 2004/0147642 A1 Jul. 29, 2004

Related U.S. Application Data

(63) Continuation of application No. 09/572,754, filed on May 16, 2000, now abandoned, which is a continuation-in-part of application No. 09/186,537, filed on Nov. 5, 1998, now Pat. No. 6,387,470.

(51) Int. Cl.
*B32B 3/04* (2006.01)
*C08L 63/00* (2006.01)
*C08J 9/04* (2006.01)

(52) U.S. Cl. ............. 428/122; 428/34.1; 428/35.7; 521/54; 521/55; 521/56; 521/57; 523/466; 525/92 H

(58) Field of Classification Search .......... 428/34.1, 428/35.7, 122; 521/54, 55, 56, 57; 523/466; 525/92 H See application file for complete search history.

(56) References Cited

U.S. PATENT DOCUMENTS 3,853,684 A 12/1974 Rubens .............. 161/160
3,931,448 A 1/1976 Parkinson ............ 428/451

(Continued)

FOREIGN PATENT DOCUMENTS

CA 2221126 11/1998

(Continued)

OTHER PUBLICATIONS

International Search Report dated Feb. 14, 2000 for International Application No. PCT/US99/24795, International Filing Date Oct. 22, 1999.

*Primary Examiner*—Marc A Patterson
(74) *Attorney, Agent, or Firm*—Rader, Fishman & Grauer, PLLC

(57) ABSTRACT

Expandable sealant and baffle compositions and methods of forming and using such compositions are provided wherein the compositions comprise a first thermoplastic resin, an epoxy resin, preferably a second thermoplastic resin different from the first thermoplastic resin, and optionally a compound selected from the group consisting of pigments, blowing agents, catalysts, curing agents, reinforcers, and mixtures thereof. The resulting compositions are formed as self-sustaining bodies which can be heat-expanded into a lightweight, high strength product for sealing hollow structural members of vehicles, substantially decreasing the noise which travels along the length of those members as well as strengthening those members with minimal increases in their weights. In a preferred embodiment, the first thermoplastic resin is an SBS block co-polymer, the epoxy resin is a bisphenol A-based liquid epoxy resin, the second thermoplastic resin is a polystyrene, and the reinforcer is hydrated amorphous silica. The compositions can be formed into free-standing, self-sustaining parts or into U-shaped members supported on lattice-type nylon supports.

17 Claims, 1 Drawing Sheet

U.S. PATENT DOCUMENTS

| | | | |
|---|---|---|---|
| 4,118,258 A | 10/1978 | Graveron et al. | 156/60 |
| 4,346,782 A | 8/1982 | Bohm | 181/204 |
| 4,352,520 A | 10/1982 | Stiglmaier et al. | 296/182 |
| 4,495,240 A | 1/1985 | McCarthy | 428/319.1 |
| 4,542,164 A | 9/1985 | Nishioka et al. | 521/135 |
| 4,610,836 A | 9/1986 | Wycech | 264/313 |
| 4,692,475 A * | 9/1987 | Rowland et al. | 521/92 |
| 4,695,343 A | 9/1987 | Wycech | 156/196 |
| 4,732,806 A | 3/1988 | Wycech | 428/241 |
| 4,734,323 A | 3/1988 | Sato et al. | 428/317.3 |
| 4,737,407 A | 4/1988 | Wycech | 428/323 |
| 4,742,115 A | 5/1988 | Mawatari et al. | 828/38 |
| 4,751,249 A | 6/1988 | Wycech | 521/54 |
| 4,769,391 A | 9/1988 | Wycech | 521/54 |
| 4,789,586 A | 12/1988 | Morimura et al. | 428/216 |
| 4,836,516 A | 6/1989 | Wycech | 269/299 |
| 4,853,270 A | 8/1989 | Wycech | 428/68 |
| 4,861,097 A | 8/1989 | Wycech | 296/188 |
| 4,883,834 A * | 11/1989 | Yamamoto et al. | 524/504 |
| 4,901,500 A | 2/1990 | Wycech | 52/79.7 |
| 4,908,930 A | 3/1990 | Wycech | 29/527.2 |
| 4,922,596 A | 5/1990 | Wycech | 29/897.2 |
| 4,923,902 A | 5/1990 | Wycech | 521/54 |
| 4,964,514 A | 10/1990 | Wycech | 206/564 |
| 4,978,562 A | 12/1990 | Wycech | 428/35.8 |
| 4,995,545 A | 2/1991 | Wycech | 228/119 |
| 5,021,513 A * | 6/1991 | Bagga | 525/328.8 |
| 5,086,080 A * | 2/1992 | Anfuso et al. | 521/59 |
| 5,093,394 A | 3/1992 | Rees et al. | 524/68 |
| 5,124,186 A | 6/1992 | Wycech | 428/35.8 |
| 5,234,757 A | 8/1993 | Wong | |
| 5,266,133 A | 11/1993 | Hanley et al. | 156/71 |
| 5,271,612 A | 12/1993 | Yada et al. | 267/158 |
| 5,274,006 A | 12/1993 | Kagoshima et al. | 521/85 |
| 5,373,027 A | 12/1994 | Hanley et al. | 521/84.1 |
| 5,506,025 A | 4/1996 | Otto et al. | 428/98 |
| 5,575,526 A | 11/1996 | Wycech | 296/205 |
| 5,725,272 A | 3/1998 | Jones | 296/208 |
| 5,755,486 A * | 5/1998 | Wycech | 296/187.02 |
| 5,782,730 A * | 7/1998 | Kawasaki et al. | 492/56 |
| 5,884,960 A | 3/1999 | Wycech | 296/146.6 |
| 5,888,600 A | 3/1999 | Wycech | 428/215.9 |
| 6,040,350 A | 3/2000 | Fukui | 521/135 |
| 6,058,673 A | 5/2000 | Wycech | 52/721.4 |
| 6,190,578 B1 * | 2/2001 | Yokoyama et al. | 252/512 |

FOREIGN PATENT DOCUMENTS

| | | |
|---|---|---|
| EP | 0500009 | 2/1992 |
| EP | 0 518 233 | 12/1992 |
| EP | 0 776 721 | 5/1997 |
| JP | 04-178439 | 6/1992 |
| JP | 04-178440 | 8/1992 |
| JP | 04-264142 | 9/1992 |
| JP | 09-208932 | 8/1997 |
| WO | 9513328 | 5/1995 |
| WO | 97/29490 * | 8/1997 |

* cited by examiner

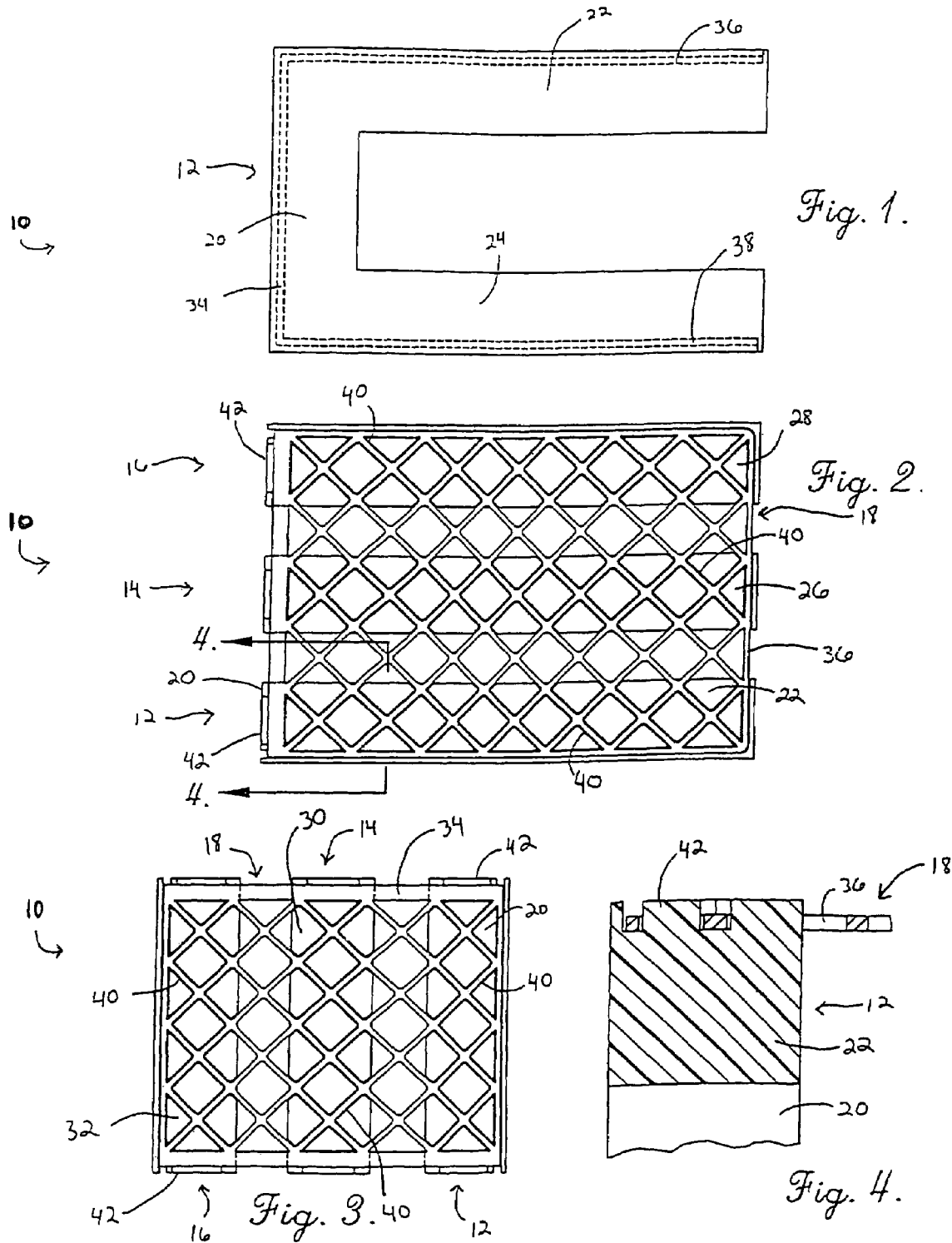

SOUND DEADENING AND STRUCTURAL REINFORCEMENT COMPOSITIONS AND METHODS OF USING THE SAME

RELATED APPLICATION

This is a continuation of U.S. patent application Ser. No. 09/572,754, filed May 16, 2000, now abandoned which is a continuation-in-part of U.S. patent application Ser. No. 09/186,537, filed Nov. 5, 1998, now U.S. Pat. No. 6,387,470 each incorporated by reference herein.

BACKGROUND OF THE INVENTION

1. Field of the Invention

The present invention is broadly concerned with expandable sealant and baffle compositions for sealing hollow structural members of vehicles, and methods for making and using such compositions. The compositions are prepared by forming an expandable mixture including a first thermoplastic resin (preferably an SBS block co-polymer) and an epoxy resin (preferably a bisphenol A-based liquid epoxy resin). The compositions preferably also include a second thermoplastic resin (preferably a polystyrene) different from the first thermoplastic resin, and a compound selected from the group consisting of pigments, blowing agents, catalysts, curing agents, reinforcers, and mixtures thereof. The preferred reinforcers are hydrated amorphous silica and glass microspheres. The compositions of the invention are injection moldable and can be formed into freestanding, self-sustaining parts. Alternately, the compositions of the invention can be supported on lattice-type nylon supports. Upon heating of the compositions to temperatures of at least about 300° F., the compositions greatly expand to form lightweight products having high compressive strengths.

2. Description of the Prior Art

During the fabrication of automobiles, trucks, and similar over-the-road vehicles, many body components present structural members having cavities that require sealing to prevent the entrance of moisture and contaminants which can cause corrosion of the body parts. It is also desirable to greatly strengthen the members while maintaining their light weight. It is also necessary to stabilize these members in order to attenuate noise that would otherwise be transmitted along the length or passage of the cavity. Many of these cavities are irregular in shape or narrow in size, thus making them difficult to properly seal and baffle.

Many attempts have been made to seal these cavities, spraying sealants into the cavity, introducing foam products into the cavity, and using of fiberglass matting and the like. These methods each have their drawbacks. For example, foaming in place presents a problem in that it is difficult to control where the foam travels upon its introduction into the cavity. Furthermore, it is often necessary to introduce an excess amount of foam into the cavity in order to ensure that the cavity is sufficiently sealed. Finally, foams will generally not adhere to the interior surfaces of the cavity walls if those surfaces contain even a small amount of oil.

Self-sustaining foam products, either with or without a non-foam support structure, have been introduced into structural member cavities in an attempt to seal the cavities. However, these methods generally result in the addition of excess weight to the structural member which is undesirable in most instances. Attempts have been made to utilize foam products which are lighter in weight or which do not use a support structure. However, these attempts have generally resulted in products which lack the increased compressive strength necessary to adequately reinforce the structural member.

U.S. Pat. No. 5,755,486 to Wycech is directed towards a structural reinforcement member which includes a thermally expandable resin-based material. The structural member is heated so as to expand the resin-based material, thus locking the reinforcement member in place. However, the compositions disclosed in the '486 patent do not possess sufficient expansion capabilities. As a result, more of the composition is required to adequately fill and seal a particular cavity, thus resulting in added weight to the car and added expense to the automotive manufacturer. Furthermore, the composition disclosed in the '486 patent makes use of fumed silica which leads to a product having a high viscosity and therefore unsuitable for injection molding of the composition.

U.S. Pat. Nos. 5,373,027 and 5,266,133 to Hanley et al. are respectively directed towards expansible sealant and baffle components for sealing and providing an acoustic baffle for cavities in vehicle bodies and methods of making such components. The components expand upon heating, thus sealing the cavity in which they are placed. The components are formed of a composition which includes an ethylene-$\alpha,\beta$ ethylenically unsaturated carboxylic acid copolymer, a blowing agent, a tackifier, and optionally an additive polymer and a cross-linking agent. While the compositions of the '027 and '133 patents possess sufficient expansion capabilities, they are not strong enough to make suitable reinforcement members.

U.S. Pat. No. 5,506,025 to Otto et al. is concerned with an expandable baffle apparatus for sealing an automobile cavity. The apparatus of the '025 patent includes a piece of heat expandable sealing material formed in a shape corresponding to the shape of the cross-section of the cavity to be sealed. The sealing material is supported by an open lattice support element formed of material such as nylon. While the apparatus of the '025 patent is suitable as a cavity sealant and baffle apparatus, it does not provide sufficient reinforcement to the structural member forming the cavity in which the apparatus is placed.

There is a need for an injection moldable, expandable, lightweight composition which acts as both a sealant to prevent the entrance of undesirable components into vehicle cavities and a baffle to diminish or prevent noises which normally travel along the length of the cavity. Furthermore, this composition should have a high compressive strength so that it reinforces the structural members in which it is used.

SUMMARY OF THE INVENTION

The instant invention overcomes these problems by providing expandable sealant and baffle compositions comprising mixtures of thermoplastic resin(s) and an epoxy resin which are injection moldable and lightweight, and which have high compressive strengths.

In more detail, the compositions of the invention include a first thermoplastic resin, usually selected from the group consisting of the polystyrenes, rubbers (preferably solid rubbers), and mixtures thereof. It is preferred that the first thermoplastic resin be a solid rubber or mixtures of solid rubbers. Preferred solid rubbers include styrene-butadiene rubber (such as SBR 1009®), nitrile-butadiene rubber (such as Nipol 1411®); thermoplastic elastomers including SBS block co-polymers (such as Fina Clear 530®), and mixtures thereof. (As used herein, "rubber" is intended to include all synthetic rubbers as well as elastomers.). If the rubber used is an SBS block co-polymer, it is preferred that the SBS block co-polymer have a molecular weight of from about 100,000-150,000, and preferably from about 110,000-135,000. When a styrene-butadiene rubber is used as the rubber, the ratio of butadiene to styrene is preferably from about 32:68 to about 18:82, and more preferably from about 27:73 to about 23:77. If the first thermoplastic resin is a rubber, then the rubber is preferably present in the composition at a level from about 20-30% by weight, and more preferably from about 23-28% by weight, based upon the total weight of the composition taken as 100% by weight.

If the first thermoplastic resin is a polystyrene, then the polystyrene should be present in the composition at a level of from about 5-20% by weight, and preferably at a level of from about 10-15% by weight, based upon the total weight of the composition taken as 100% by weight. It is preferable that the polystyrene have a molecular weight of from about 150,000-320,000, and more preferably from about 200,000-270,000. Two preferred polystyrenes are sold under the trade names Fina Crystal 500® and Fina Crystal 535®.

The compositions further include an epoxy resin, preferably a liquid epoxy resin such as a bisphenol A-based liquid epoxy resin. The epoxy resin should be present in the composition at a level of from about 30-45% by weight, and preferably from about 35-40% by weight, based upon the total weight of the composition taken as 100% by weight. A preferred solid epoxy resin is available under the trade name Epon 1001 F®. Two preferred liquid epoxy resins are sold under the trade names Araldite 6010® and Epon 71®.

In a particularly preferred embodiment, the compositions of the inventions further include a second thermoplastic resin different from the first thermoplastic resin. The second thermoplastic resin is likewise preferably selected from the group consisting of the polystyrenes, rubbers (preferably solid rubbers or thermoplastic elastomers), and mixtures thereof. It is preferred that the first thermoplastic resin be a solid rubber and mixtures of solid rubbers while the second thermoplastic resin is preferably a polystyrene, with the individual concentrations of solid rubber and polystyrene being those described above. The total weight of both the first thermoplastic resin and the second thermoplastic resin is preferably from about 25-50% by weight, and more preferably from about 33-43% by weight, based upon the total weight of the composition taken as 100% by weight.

In another embodiment, the compositions of the invention further include a third thermoplastic resin in addition to and different from the first and second thermoplastic resins. The third thermoplastic resin is preferably selected from the group consisting of polystyrenes, rubbers (preferably solid rubbers or thermoplastic elastomers), and mixtures thereof. In compositions according to the invention which include a third thermoplastic resin, the third resin should be present in an amount of from about 1-10% by weight, and preferably from about 3-7% by weight, based upon the total weight of the composition taken as 100% by weight. A preferred third thermoplastic resin is a solid rubber such as nitrile-butadiene rubber (NBR). When NBR is used as the third thermoplastic resin, the ratio of acrylonitrile to butadiene is preferably from about 42:58 to about 35:65, and more preferably about 38:62.

The compositions of the invention should also include a compound selected from the group consisting of pigments, blowing agents, catalysts, curing agents, reinforcers, and mixtures thereof. Any pigments, blowing agents, catalysts, and curing agents known in the art are suitable for use in the instant invention. Examples of some of those compounds and their preferred concentrations in the compositions of the invention are set forth in Table 1. It is preferred that the compositions be essentially free (i.e., less than about 0.1% by weight, and preferably about 0% by weight) of plasticizers, diluents, and surfactants in order to avoid the negative effects these compounds have on the compressive strength of the composition during heating thereof.

TABLE 1

| Compound | % By Wt.[a] | Examples |
| --- | --- | --- |
| Pigments | 0-5% | Carbon black, zinc oxide |
| Blowing agents | 0-5% | Azodicarbonamides such as the following which are available from Uniroyal - Celogen AZ 765 ®, Celogen AZ 754A ®, and Celogen AZ 130 ® |
| Catalysts | 0-5% | Urea-based catalysts such as N,N dimethyl phenyl urea and catalysts sold under the trade names MBTS ®, Dicup ®, and Urisys U 405 ® |
| Curing agent | 0-5% | Sulfur, dicyandiamide, including the curing agent sold under the trade name Urisys DDA 10 ® |

[a]Percent by weight of the particular compound, based upon the total weight of the composition taken as 100% by weight.

The preferred reinforcers are selected from the group consisting of hydrated amorphous silica, glass microspheres, and mixtures thereof. Glass microspheres are particularly preferred because they greatly increase the strength of the cured composition while only slightly increasing the weight thereof. Preferably the compositions hereof include from about 1-10% by weight hydrated amorphous silica and from about 10-20% glass microspheres. Utilizing both of these reinforcers results in a composition having a very high compressive strength. Also, hydrated amorphous silica is important for providing a composition that has high expansion capabilities as well as a viscosity (at 110° C.) of less than about 1500 P, and preferably less than about 1250 P, so that the composition can readily be injection molded.

One of the most preferred embodiments of the compositions in accordance with the instant invention includes the following: from about 20-30% by weight SBS block co-polymer; from about 5-20% by weight polystyrene; from about 30-45% by weight bisphenol A-based liquid epoxy resin; from about 0.5-5% by weight carbon black; from about 1-10% by weight hydrated amorphous silica; from about 10-20% by weight glass microspheres; from about 0.5-5% by weight blowing agent; from about 0.3-5% by weight catalysts; and from about 1-5% by weight curing agent, with all percents by weight being based upon the total weight of the composition taken as 100% by weight.

Another particularly preferred embodiment of the invention includes the following: from about 20-30% by weight SBS block co-polymer; from about 5-20% by weight polystyrene; from about 0.5-5% by weight of a rubber (e.g., nitrile-butadiene rubber); from about 30-45% by weight bisphenol A-based liquid epoxy resin; from about 0.5-5% by weight of a pigment (e.g., carbon black); from about 1-10% by weight hydrated amorphous silica; from about 10-20% by weight glass microspheres; from about 0.1-5% by weight blowing agent (e.g., azodicarbonamide); from about 0.1-5% by weight catalysts (e.g., N,N-dimethyl phenyl urea); from about 0.1-5% by weight curing agent (e.g., dicyandiamide); and up to about 5% of a accelerator compound (e.g., zinc oxide) to lower the blowing temperature of the composition, with all percents by weight being based upon the total weight of the composition taken as 100% by weight.

The compositions of the invention are formed by mixing the first thermoplastic resin (preferably solid rubber) with a small portion (about 1/40th of the total amount) of the epoxy resin in a heated mixer until the temperature of the mixer reaches from about 240-260° F. (the temperature of the mixture within the mixer is at least about 175° F.), and the mixture is substantially homogeneous, at which time all of the second thermoplastic resin (preferably a polystyrene) is added to the mixer and mixing is continued. After the second thermoplastic resin is substantially mixed with the first thermoplastic resin/epoxy resin mixture, the remainder of the epoxy resin is slowly added to the mixer, stopping and starting the mixer as necessary, with the ingredients being thoroughly mixed to obtain a substantially homogeneous mixture. The resulting "premix" can then be used immediately to form the final composition or, alternately, can be formed into a thick sheet (approximately 20 mm) via a two-roll mill, cut into pieces, and stored for later use.

To form the final composition from the premix, the desired amount of premix is placed in a heated mixer (set at a temperature of about 250° F.) and mixing is commenced. While mixing, the desired pigments are added to the mixer and mixing is stopped once a homogeneous mixture is obtained within the mixer. While mixing is stopped, one of the desired reinforcers is added to the mixer and mixing is resumed and continued until the mixture is homogeneous. This step can be repeated, adding additional reinforcers as desired.

The temperature of the mixer is then set to a temperature below 160° F. When the temperature of the mixer drops below 160° F., the desired blowing agents, curing agents, and/or catalysts are added and mixing is resumed and continued only until the mixture is homogeneous. The resulting mixture is then preferably extruded into strands (at an extruder temperature of 170-180° F. and screw rotation speeds of about 400 rpm) and cut into pellets. Alternately, the desired blowing agents, curing agents, and/or catalysts can be dry blended with the cut pellets rather than being added to the mixture prior to extrusion. The pellets are then injection molded into the desired shape at a temperature of about 180-200° F. using any injection molding techniques and equipment known in the art. Those skilled in the art will appreciate that the desired shape of the molded composition will depend upon the volume of the cavity to be sealed and baffled, as well as the configuration of that cavity thus ensuring that the composition fully expands into a sealing relationship with the structural sidewalls. The molded product that is formed is a physical mixture, and no chemical reactions have occurred prior to the heating of the product within the vehicle cavity to a temperature of at least about 300° F.

While the sealing and baffling compositions of the invention can be manufactured as formed, freestanding parts, in other embodiments the compositions can be supported on a support element comprising an open lattice formed in the same shape as of the composition, thus forming a sealant and baffle apparatus. Preferred lattice support elements are formed of nylon, and particularly glass reinforced nylon. Use of open lattice supports allows the composition to expand through the openings of the lattice upon heating of the composition to a temperature of at least about 300° F. This structure is superior to the structure in U.S. Pat. No. 5,755,486 to Wycech as the use of a lattice support element adds minimal weight to the apparatus.

The expanded composition then adheres to adjacent walls of the cavity in which the apparatus is placed. Preferred apparatuses comprise a plurality of U-shaped expandable composition structures spaced apart from one another and in general alignment, having the lattice support element attached to the three outer surfaces of the U-shaped structure. This embodiment provides for contact by the composition with a greater surface area of the cavity walls than is provided by U.S. Pat. No. 5,506,025 to Otto et al., thus providing superior reinforcement of structural member forming the cavity.

In use, the compositions of the invention are formed into the U-shaped structure described above, or are shaped (in either free standing form or some type of lattice-supported form) to conform to the cross-sectional shape of (although slightly smaller than) the cavity in which the composition or apparatus is to be used. The formed composition or apparatus is then placed within the hollow channel or cavity and heat is applied so that the composition expands as the epoxy resin is crosslinked and the expanded composition adheres to the sidewalls of the cavity resulting in a channel or cavity that is substantially blocked by the expanded composition. Optionally, some type of fastening device or mechanism can be utilized to secure the composition within the channel prior to heat expansion.

It will be appreciated that the compositions of the invention can be used in virtually any area of the automotive industry, including body shops, paint shops, and automobile manufacturing facilities. A particular advantage of the compositions and apparatuses of the invention is that they can be placed within the desired channel prior to conveyance of the vehicle body through a bake oven where the temperatures are sufficiently high to expand the composition.

When the sealants and baffle compositions of the invention are subjected to a temperature of at least about 300° F., the percent expansion of the composition will be from about 80-220% and preferably from about 95-200% wherein the percent expansion (as used herein) is defined as:

$$100 \times \{[(\text{the specific gravity of the composition before heating}) - (\text{the specific gravity of the composition after heating})]/(\text{the specific gravity of the composition after heating})\}.$$

The expanded compositions have a compressive strength (using a sample having a diameter of 2 inches and a length of 4 inches and a compression rate of 0.5 inches/minute) of at least about 1200 psi, preferably at least about 1400 psi, and more preferably at least about 1600 psi. Prior to expansion, the compositions have a specific gravity (with reference to water) of at least about 0.90, while the specific gravity (with reference to water) of the expanded compositions is less than about 0.47, preferably less than about 0.37, and more preferably less than about 0.32. The compositions of the invention have a ratio of compressive strength:specific gravity after bake of at least about 2500:1, preferably at least about 3000:1, and more preferably at least about 3600:1.

BRIEF DESCRIPTION OF THE DRAWINGS

FIG. 1 is a side elevation view of the preferred U-shaped sealant and baffle apparatus utilizing the open lattice support element in accordance with the invention;

FIG. 2 is a top plan view of the apparatus of FIG. 1;

FIG. 3 is a left end elevation view of the apparatus of FIG. 1; and

FIG. 4 is a fragmentary sectional view taken along line 4-4 of FIG. 2.

DETAILED DESCRIPTION OF THE PREFERRED EMBODIMENTS

Turning now to the drawings, a sealant and baffle apparatus 10 is shown in FIGS. 1-4. The apparatus 10 broadly includes three expandable, U-shaped members 12, 14, 16 (see FIGS. 1 and 2) and a support element 18 (see FIGS. 2 and 3).

In more detail and referring to FIG. 1, member 12 includes a base portion 20 and two leg portions 22, 24. Members 14, 16 are identical to member 12 in that they each include a base portion and two leg portions. Leg portions 26, 28 of members 14, 16, respectively, are illustrated in FIG. 2, while base portions 30, 32 of members 14, 16, respectively, are illustrated in FIG. 3. In each of members 12, 14, 16, the leg portions are substantially perpendicular to their respective base portions. Stated otherwise, each of the legs of members 12, 14, 16 is essentially parallel to its counterpart leg on the respective member. Members 12, 14, 16 are each formed of the heat expandable compositions of the invention and are preferably injection molded as integral members into the illustrated U-shape.

Support element 18 is formed of three sections, i.e., a base section and two leg sections, which are likewise configured into a U-shape. Base section 34 of element 18 is illustrated in FIG. 3 while leg section 36 is illustrated in FIG. 2. The final leg section 38 of element 18 is shown in phantom in FIG. 1. Each of sections 34, 36, 38 of support element 18 have a latticework structure and are formed of a material having a melting point higher than the temperature at which members 12, 14, 16 expand. A preferred material for element 18 is nylon, and particularly glass reinforced nylon.

The outside planar surfaces of the base and leg portions of members 12, 14, 16 are preferably formed with depressions (indicated by double lines 40 in FIGS. 2 and 3). These depressions correspond in both size and shape with the size and shape of the latticework of element 18. The depressions are preferably at least as deep as the lattice is thick, and act as a retaining mechanism so that element 18 remains attached to members 12, 14, 16. Thus, the expandable composition of which members 12, 14, 16 are formed protrudes somewhat through the lattice openings of element 18 (as indicated by numeral 42 in FIGS. 2-4). Element 18 can be formed so that each of the sections 34, 36, 38 are integral, or alternately, each of sections 34, 36, 38 can be formed separately and connected by some fastening mechanism (such as clips or snaps) around the members 12, 14, 16 of the apparatus.

In operation, the apparatus 10 is positioned within the channel of a hollow member (such as within a vehicle). The apparatus 10 can be positioned at any angle and orientation as determined appropriate by one having ordinary skill in the art. For example, the base portions 20, 30, 32 and base section 34 of apparatus 10 can be positioned against the lower wall of the channel, while the respective leg portions and sections of apparatus 10 would be positioned against the sidewalls of the channel. Or, the apparatus 10 could be inverted so that the base portions 20, 30, 32 and base section 34 are positioned against the upper wall of the channel.

Once the apparatus 10 is positioned within the channel, the apparatus 10 is then subjected to heat (such as by passing the vehicle through a bake oven), preferably having a temperature of at least about 300° F. The heat application will cause the composition to expand in all directions, thus protruding even further through the openings of the latticework. The expanded composition will then adhere to the walls of the channel, securing apparatus 10 within the channel.

While the figures illustrate an embodiment utilizing a support structure for the compositions of the invention, those skilled in the art will understand that the compositions of the invention do not require a support structure and can be used in a freestanding, self-sustaining form. Also, numerous other support elements can be used with the compositions of the invention depending upon the particular application.

EXAMPLES

The following examples set forth preferred compositions and methods in accordance with the invention. It is to be understood, however, that these examples are provided by way of illustration and nothing therein should be taken as a limitation upon the overall scope of the invention.

Example 1

1. Preparation of Premix

A mixer (Moriyama Company, Japan) equipped with a ram was used to prepare a premix. The temperature of the mixer was set to 210° F., and 266.67 grams of Fina Clear 530® (SBS block copolymer) was added to the mixer followed by the addition of about 10 grams of Araldite 6010® (liquid epoxy resin). The ram was lowered and slow mixing was commenced when the temperature of the mixer had reached 200° F. Mixing was continued until the mixture was substantially homogeneous, and the temperature display indicated 250° F. At this point, the ram was opened and 133.33 grams of Fina Crystal 500® (polystyrene) was added to the mixer. Mixing was continued until the material in the mixer became substantially homogeneous. The remainder of the Araldite 6010® (about 390 grams) was added to the mixture slowly, in small increments, with mixing carried out between each addition.

After all of the Fina Crystal 500® was added, the resulting mixture was thoroughly mixed for about 5 minutes, and the material was then transferred to a 2-roll mill. The material was milled into sheets having a thickness of about 20 mm, and cut into pieces to be used later.

2. Preparation of the Intermediate Compound

In this step, a Moriyama mixer equipped with a ram was also used, with the temperature of the mixer being set at 250° F. The premix made in Part 1 of this Example was added to the mixer. Mixing was commenced, and 10 grams of carbon black (pigment) was added to the mixer. When the mixture became homogeneous, mixing was stopped, 60 grams of HiSil 233® (hydrated amorphous silica) was added to the mixture, and mixing was resumed. Mixing continued until the mixture was homogeneous, at which time mixing was again stopped and 140 grams of Scotchlite S60/10,000® (glass microspheres) was added to the mixture. Mixing was resumed and was continued until the resulting mixture was homogeneous. The temperature of the mixer was set below 160° F. When the mixer temperature cooled to below 160° F., 16 grams of Celogen AZ 765® (blowing agent) and 64 grams of Urisys DDA 10® (curing agent) was added to the mixer and mixing was resumed and continued only until the mixture was homogeneous.

3. Pelletization of the Intermediate Compound and Injection Molding of the Pellets The compound formed in Part 2 of this Example was fed into the inlet of a single screw extruder set at an extruder temperature of 175° F. The screw was rotated at a speed of about 400 rpm, and the stranded compound was cut into pellets as it emerged from the die positioned at the outlet of the extruder barrel. The die used was one designed to make pellets of such a size that 90 (±10) of the pellets weighed 1 gram.

The pellets were added to the hopper (not equipped with a stirrer) of a conventional injection mold machine and molded into the desired shapes at about 190° F.

4. Test Properties of the Molded Product

The mechanical properties of the compound were tested. Those properties are reported in Table 2 below. These tests were carried out as follows on 10 mm thick, 1 in.×1 in portion 1 of the product prepared as previously described:

(1) Specific Gravity Before Bake.
(2) Specific Gravity After Bake—The composition was placed in an oven heated to 325° F. The composition was kept in the oven for 10 minutes after the temperature of the composition reached 325° F. (referred to as 325° F. for 10 minutes Metal Temperature). The composition was then removed from the oven and allowed to remain at room temperature (RT) for 60 minutes (referred to as RT for 60 minutes). This was followed by 325° F. for 10 minutes Metal Temperature, then RT for 60 minutes, and finally 250° F. for 20 minutes Metal Temperature, followed by the determination of the specific gravity.
(3) Expansion After Bake=[(specific gravity before bake)−(specific gravity after bake)]/(specific gravity after bake)
(4) Compressive Strength After Bake—The compressive strength was determined after the following was carried out: the composition remain in a 350° F. oven for a total of 35 minutes; RT for 60 minutes; and finally 250° F. for 20 minutes metal temperature.

TABLE 2

| MECHANICAL TEST | RESULTS |
| --- | --- |
| Specific Gravity Before Bake | 0.96 |
| Specific Gravity After Bake | 0.38 |
| Percent Expansion | 153 |
| Compressive Strength, psi[a] | 655[b] |

[a]The test specimens were aged in a 90° C. oven for four hours and tested immediately upon removal from the oven.
[b]Several tests of the compressive strength were conducted on this sample. This number is the average of the results of all tests conducted.

Example 2

A molded compound was formed following the procedures set forth in Example 1 except that the following components and concentrations were used: 133.33 grams of Fina Crystal 500®; 266.67 grams of Fina Clear 530®; 400 grams of Araldite 6010®; 10 grams of carbon black; 4.8 grams of zinc oxide (pigment); 45 grams of HiSil 233®; 155 grams of Scotchlite S60/10,000®; 30 grams of Urisys DDA 10®; 4 grams of Urisys U 405® (catalyst); and 6 grams of Celogen AZ 130® (blowing agent), The catalyst was added at the same time as the blowing agent and curing agent. The final product was tested for its mechanical properties as described in Example 1 and as set forth in Table 3.

TABLE 3

| MECHANICAL TEST | RESULTS |
| --- | --- |
| Specific Gravity Before Bake | 0.95 |
| Specific Gravity After Bake | 0.37 |
| Percent Expansion | 150 |
| Compressive Strength, psi[a] | 1419[b] |
| Viscosity (110° C.), P | 1240 |

[a]The test specimens were aged in a 90° C. oven for four hours and tested immediately upon removal from the oven.
[b]Several tests of the compressive strength were conducted on this sample. This number is the average of the results of all tests conducted.

Example 3

A molded compound was formed following the procedures set forth in Example 1 except the following components and concentrations were used: 120 grams of Fina Crystal 500®; 240 grams of FinaClear 530®; 40 grams of Nipol 1411® (nitrile-butadiene rubber); 400 grams of Araldite 6010®; 10 grams of carbon black; 4.8 grams of zinc oxide; 45 grams of HiSil 233®; 155 grams of Scotchlite S60/10,000®; 30 grams of Urisys DDA 10®; 4 grams of Urisys U 405®; and 6 grams of Celogen AZ 130®. The final product was tested for its mechanical properties as set forth in Table 4.

TABLE 4

| MECHANICAL TEST | RESULTS |
| --- | --- |
| Specific Gravity Before Bake | 0.9 |
| Specific Gravity After Bake | 0.39 |
| Percent Expansion | 131 |
| Compressive Strength, psi[a] | 1822[b] |

[a]The test specimens were aged in a 90° C. oven for four hours and tested immediately upon removal from the oven.
[b]Several tests of the compressive strength were conducted on this sample. This number is the average of the results of all tests conducted.

Example 4

Several more compositions were prepared following the preparation procedures set forth in the preceding examples. The formulations and mechanical properties of the resulting compounds are set forth in Tables 5 and 6, respectively.

TABLE 5

| Ingredient | A (grams) | B (grams) | C (grams) | D (grams) |
| --- | --- | --- | --- | --- |
| Fina Crystal 500 ® | 133.33 | 133.33 | 133.33 | 133.33 |
| Fina Clear 530 ® | 266.67 | 266.67 | 266.67 | 266.67 |
| Araldite 6010 ® | 340 | 400 | 400 | 400 |
| Epon 1001F ® | 60 | — | — | — |
| Carbon Black | 10 | 10 | 10 | 10 |
| Zinc Oxide | 4.8 | 4.8 | 4.8 | 4.8 |
| HiSil 233 ® | 45 | 45 | 45 | 45 |
| Scotchlite S60/10,000 ® | 155 | 155 | 155 | 155 |
| Rubbersil 150 ® (hydrated amorphous silica) | — | 40 | — | — |
| Quincy 325 ® (CaCO₃) | — | — | 40 | — |
| Magsil 399 ® (talc) | — | — | — | 40 |
| Urisys DDA 10 ® | 30 | 30 | 30 | 30 |
| Urisys U 405 ® | 4 | 4 | 4 | 4 |
| Celogen AZ 130 ® | 6 | 6 | 6 | 6 |

TABLE 6

| Test Data | A | B | C | D |
| --- | --- | --- | --- | --- |
| Specific Gravity Before Bake | 0.94 | 0.96 | 0.95 | 0.94 |
| Specific Gravity After Bake | 0.38 | 0.42 | 0.4 | 0.41 |
| Percent Expansion | 147 | 129 | 138 | 129 |
| Compressive Strength, psi[a] | 1526[b] | 2129[b] | 1422[b] | 1621[b] |

[a]The test specimens were aged in a 90° C. oven for four hours and tested immediately upon removal from the oven.
[b]Several tests of the compressive strength were conducted on this sample. This number is the average of the results of all tests conducted.

Example 5

This test was carried out to compare the effect of using fumed silica in the composition rather than hydrated amorphous silica. The procedure followed to prepare the composition was as described in the previous examples. The components and concentrations used were as follows: 133.33 grams of Fina Crystal 500®; 266.67 grams of Fina Clear 530®; 400 grams of Araldite 6010®; 10 grams of carbon black; 4.8 grams of zinc oxide; 45 grams of Cabot TS-720® (fumed silica); 155 grams of Scotchlite S60/10,000®; 30 grams of Urisys DDA 10®; 4 grams of Urisys U 405®; and 6 grams of Celogen AZ 130®. The properties of the resulting compound are set forth in Table 7 below.

TABLE 7

| MECHANICAL TEST | RESULTS |
| --- | --- |
| Specific Gravity Before Bake | 0.93 |
| Specific Gravity After Bake | 0.43 |
| Percent Expansion | 116 |
| Compressive Strength, psi[a] | 1572[b] |
| Viscosity (110° C.), P | 3600 |

[a]The test specimens were aged in a 90° C. oven for four hours and tested immediately upon removal from the oven.
[b]Several tests of the compressive strength were conducted on this sample. This number is the average of the results of all tests conducted.

In comparing these results to the results of the previous examples, it can be seen that this compound has a lower expansion than the other compounds. Furthermore, the viscosity is much higher than the viscosity of the compound obtained in Example 2, where hydrated amorphous silica was used. With such a high viscosity, this compound would not be useful in injection molding.

Example 6

This test was carried out to determine the effect on the mechanical properties of the composition if no polystyrene was used. The procedure followed to prepare the composition was as described in the previous examples. The components and concentrations used were as listed in Example 2, with the exception that no Fina Crystal 500® (or any other polystyrene) was used. The properties of the resulting compound are set forth in Table 8 below.

TABLE 8

| MECHANICAL TEST | RESULTS |
| --- | --- |
| Specific Gravity Before Bake | 0.93 |
| Specific Gravity After Bake | 0.38 |
| Percent Expansion | 145 |
| Compressive Strength, psi[a] | 913[b] |

[a]The test specimens were aged in a 90° C. oven for four hours and tested immediately upon removal from the oven.
[b]Several tests of the compressive strength were conducted on this sample. This number is the average of the results of all tests conducted.

Example 7

This test was carried out to determine the effect on the mechanical properties of the composition if no SBS (or any other rubber) was used. Preparation of the composition was commenced following the previously described procedures. However, the preparation was aborted during the preparation of the premix because, without the use of a rubber, the initial ingredients could not be mixed.

Example 8

This test was carried out to determine how the use of SBR, in addition to SBS rubber, would affect the overall properties of the composition. The procedure followed to prepare the composition was as described in the previous examples. The components and concentrations used were as follows: 120.0 grams of Fina Crystal 500®; 240 grams of Fina Clear 530®; 40 grams of SBR 1009®, crumb; 400 grams of Araldite 6010®; 10 grams of carbon black; 4.8 grams of zinc oxide; 45 grams of HiSil 233®; 155 grams of Scotchlite S60/10,000®; 30 grams of Urisys DDA 10®; 4 grams of Urisys U 405®; and 6 grams of Celogen AZ 130®. The properties of the resulting compound are set forth in Table 9.

TABLE 9

| MECHANICAL TEST | RESULTS |
| --- | --- |
| Specific Gravity Before Bake | 0.91 |
| Specific Gravity After Bake | 0.35 |
| Percent Expansion | 160 |
| Compressive Strength, psi[a] | 1095[b] |

[a]The test specimens were aged in a 90° C. oven for four hours and tested immediately upon removal from the oven.
[b]Several tests of the compressive strength were conducted on this sample. This number is the average of the results of all tests conducted.

We claim:

1. A composition useful for forming a reinforcing body, said composition comprising:
   from about 20-30% by weight of an SBS block co-polymer;
   from about 5-20% by weight polystyrene;
   from about 0.5-5% by weight of a rubber; and
   from about 30-45% by weight of an epoxy resin,
   wherein said composition has a percent expansion of from about 80-220% after heating thereof to a temperature of at least about 300° F.

2. A composition useful for forming a reinforcing body, said composition comprising:
   from about 20-30% by weight of an SBS block co-polymer;
   from about 5-20% by weight polystyrene;
   from about 0.5-5% by weight of a rubber; and
   from about 30-45% by weight of an epoxy resin,
   wherein said composition has a compressive strength of at least about 1400 psi upon being expanded by heating to a temperature of at least about 300° F.

3. A composition useful for forming a reinforcing body, said composition comprising:
   from about 20-30% by weight of an SBS block co-polymer;
   from about 5-20% by weight polystyrene;
   from about 0.5-5% by weight of a rubber; and
   from about 30-45% by weight of an epoxy resin,
   wherein said composition has a compressive strength of at least about 1400 psi and a percent expansion of from about 8 0-220% upon being expanded by heating to a temperature of at least about 300° F.

4. The composition of claim 3, said composition further comprising from about 0.5-5% by weight of a pigment.

5. The composition of claim 3, said composition further comprising from about 1-10% by weight hydrated amorphous silica.

6. The composition of claim 3, said composition further comprising from about 10-20% glass micro spheres.

7. The composition of claim 3, said composition further comprising from about 0.1-5% by weight of a blowing agent.

8. The composition of claim 3 said composition further comprising from about 0.5-5% by weight of a catalyst.

9. The composition of claim 3, said composition further comprising from about 0.1-5% by weight of a curing agent.

10. The composition of claim 3, said composition further comprising a compound for lowering the blowing temperature of the composition.

11. The composition of claim 3, wherein said rubber is a nitrile-butadiene rubber and said epoxy resin is a bisphenol A-based liquid epoxy resin, and said composition further comprises:
- from about 0.5-5% by weight of a pigment;
- from about 1-10% by weight hydrated amorphous silica;
- from about 10-20% by weight glass microspheres;
- from about 0.1-5% by weight of a blowing agent;
- from about 0.1-5% by weight of a catalyst;
- from about 0.1-5% by weight of a curing agent; and
- up to about 5% by weight of a compound for lowering the blowing temperature of the composition.

12. The composition of claim 11, wherein said pigment comprises carbon black, said blowing agent comprises azodicarbonamide, said catalyst comprises N,N-dimethyl phenyl urea, said curing agent comprises dicyandiamide, and said compound for lowering the blowing temperature comprises zinc oxide.

13. A composition of claim 3, wherein the percent expansion is from about 95% to about 200%.

14. A composition of claim 13, wherein the compressive strength is at least about 1600 psi.

15. A composition of claim 3, wherein the percent expansion is from about 129% to about 147%.

16. A composition of claim 15, wherein the compressive strength is from about 1422 psi to about 2129 psi.

17. A composition of claim 15, wherein the compressive strength is at least about 1600 psi.

* * * * *

UNITED STATES PATENT AND TRADEMARK OFFICE
CERTIFICATE OF CORRECTION

| | | |
|---|---|---|
| PATENT NO. | : 7,632,559 B2 | Page 1 of 1 |
| APPLICATION NO. | : 10/759449 | |
| DATED | : December 15, 2009 | |
| INVENTOR(S) | : Chang et al. | |

It is certified that error appears in the above-identified patent and that said Letters Patent is hereby corrected as shown below:

Column 12, line 49, change "8 0-220%" to --80-220%--

Column 12, line 57, change "micro spheres" to --microspheres--

Column 12, line 60, change "of claim 3" to --of claim 3,--

Signed and Sealed this

Sixteenth Day of March, 2010

David J. Kappos
*Director of the United States Patent and Trademark Office*